J. H. WHITNEY.
Chain and Wheel for Transmitting Power.
No. 163,832. Patented May 25, 1875.
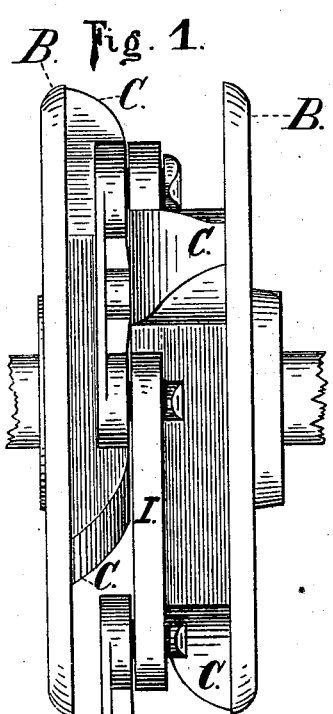
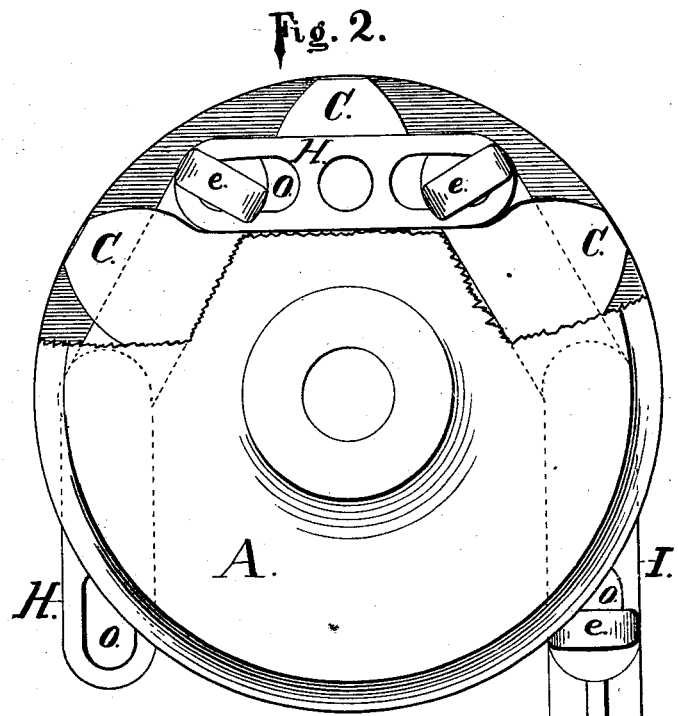
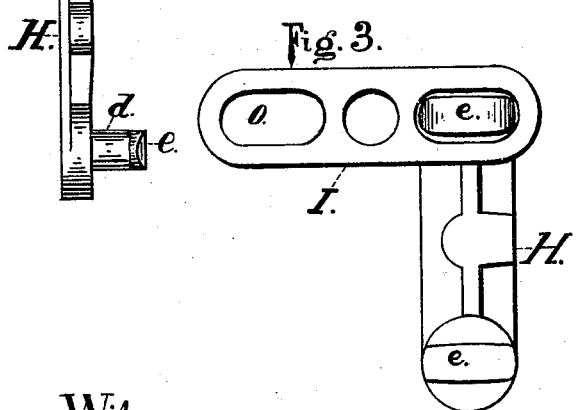
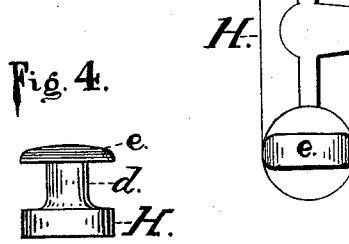
Witnesses:
Thos. Houghton.
R. H. Dodge.
Inventor:
J. H. Whitney
by Dodgerson
Attys.
THE GRAPHIC CO. PHOTO-LITH. 39 & 41 PARK PLACE, N.Y.

UNITED STATES PATENT OFFICE.

JOHN H. WHITNEY, OF ST. LOUIS, MISSOURI, ASSIGNOR TO SUMNER & WHITNEY MANUFACTURING COMPANY, OF SAME PLACE.

IMPROVEMENT IN CHAINS AND WHEELS FOR TRANSMITTING POWER.

Specification forming part of Letters Patent No. 163,832, dated May 25, 1875; application filed November 20, 1874.

*To all whom it may concern:*

Be it known that I, JOHN H. WHITNEY, of St. Louis, in the county of St. Louis and State of Missouri, have invented certain Improvements in Chain and Wheel, of which the following is a specification:

My invention relates to chains, and wheels for the same, of that class used for transmitting power; and the invention consists of a chain composed of a series of flat-bar links, one of which has holes in its ends, while the next is provided with studs projecting from its sides, which fit in the holes of the first, thus serving to connect the links, and yet permit them to be unhooked when desired, and in a wheel of novel construction for use with said chain, as hereinafter described.

Figure 1 is an edge view of the wheel and chain. Fig. 2 is a side elevation, a portion being shown in section; Figs. 3 and 4, views of the links detached.

The object of my invention is to produce a simple and cheap chain and wheel to be used in transmitting power, or any similar purpose, and which shall be capable of having the chain readily separated, so that links may be taken out or put in at pleasure.

In constructing the chain, I provide a series of links, I, which, as shown in the drawings, consists of a simple flat bar or piece of metal, having an oblong hole, $o$, in it near each end, as shown clearly in Fig. 3. I also make another set of links, H, each of which has a round stud, $d$, projecting from one of its faces near each end, these studs $d$ having a T or cross head on their outer ends, as shown in the several figures. These cross-heads $e$ are made of such a size as to enter readily through the oblong holes $o$ when turned to the proper position, as shown in Fig. 3, the cross-heads standing at right angles to the body of the link, so that the links, when united, cannot be separated without turning the two adjoining links at right angles to each other.

These links I propose to make of malleable cast-iron, whereby they can be made at a trifling cost.

In order to operate this chain without danger of breaking the links, I construct a wheel, A, as represented in Figs. 1 and 2. It may be described as composed of two disks, B and B', each provided on their inner faces with a polygonal solid hub, provided at equal distances apart with a series of radial projections, C, the distance or space between these projections being just equal to the length of the links, as shown in Fig. 2. These two disks, with their hubs and projections, are united face to face, as shown in Fig. 1, in such a manner that the projections C on one side will come midway between the two on the opposite side, thus alternating on opposite sides all the way around the wheel, the whole being cast in one solid piece.

The ends of the links are rounded, and the sides of the projections C are of a corresponding form, so that when the chain is on the wheel, the ends of the links will bear firmly against the projections C, and not tend to slip off, as shown in Fig. 2.

In operation, the chain is placed on the wheel, as represented in Fig. 1, and it will be seen that as the wheel is rotated, the end of each successive link will bear firmly against the projections C, leaving the joint of the links free to move without obstruction, the link I turning freely on the round stud $d$ of the link H.

In the present instance I have represented the wheel as having three of the projections C on each side; but it is obvious that it may be made with any desired number, provided the adjoining faces or sides of the hubs be arranged to stand at more than a right angle to each other, so as to prevent the links from turning one upon another far enough to permit the cross-heads $e$ to come in line with the openings $o$, though even then the links would not unhook while under strain or tension.

As shown in Figs. 1 and 2, the outer ends of the projections C are beveled or rounded off on three sides, so as to cause the links to assume their proper position as they come upon the wheel, and so as to permit them to be drawn off from it without obstruction.

By these means I am enabled to produce an exceedingly cheap and simple chain and wheel, which is adapted for use in machinery under many circumstances, and which can be lengthened or shortened at will, by adding or taking out links, without the use of any tool whatever.

This chain is specially adapted for use on harvesters to drive the rake, or transmit power to other operating parts, and may be used for any similar purpose with other mechanism.

Having thus described my invention, what I claim is—

1. A chain composed of the links H and I, constructed to operate substantially as described.

2. The wheel A, provided with the projections C, arranged alternately on opposite sides, substantially as shown and described, whereby it is adapted for use in combination with the links H and I, as set forth.

JOHN H. WHITNEY.

Witnesses:
W. C. DODGE,
WILL. W. DODGE.